United States Patent [19]

Larson et al.

[11] Patent Number: 4,575,436

[45] Date of Patent: Mar. 11, 1986

[54] PRODUCTION OF NUCLEAR FUEL PRODUCTS

[75] Inventors: Richard I. Larson, Wilmington, N.C.; William E. Smith, Schenectady, N.Y.

[73] Assignee: General Electric Company, San Jose, Calif.

[21] Appl. No.: 627,256

[22] Filed: Jul. 2, 1984

Related U.S. Application Data

[63] Continuation of Ser. No. 410,978, Aug. 24, 1982, abandoned.

[51] Int. Cl.$^4$ .......................... G21C 3/62; G21C 21/02
[52] U.S. Cl. ........................................ 264/0.5; 252/639
[58] Field of Search ................ 264/0.5; 252/628, 629, 252/643, 639

[56] References Cited

U.S. PATENT DOCUMENTS

| | | | |
|---|---|---|---|
| 3,992,494 | 11/1976 | Holden | 264/0.5 |
| 4,061,700 | 12/1977 | Gallivan | 264/0.5 |
| 4,138,360 | 2/1979 | Gallivan | 264/0.5 X |
| 4,284,593 | 8/1981 | Sutcliffe et al. | 264/0.5 |
| 4,293,507 | 10/1981 | Sutcliffe et al. | 264/0.5 |
| 4,383,953 | 5/1983 | Larson et al. | 264/0.5 |

*Primary Examiner*—Teddy S. Gron
*Assistant Examiner*—Virginia B. Caress
*Attorney, Agent, or Firm*—Ivor J. James, Jr.; Samuel E. Turner; Raymond G. Simkins

[57] ABSTRACT

An improved method for compression molding of typically brittle ceramic materials comprising uranium dioxide which enhances their compacting and cohering properties in the manufacture of nuclear fuel products. The uranium dioxide is mixed with a fugitive binder comprising a high molecular weight acrylic acid polymer and ammonium bicarbonate. The mixture is then pressed and sintered to expel the binder and to give a fissionable nuclear fuel pellet.

8 Claims, No Drawings

PRODUCTION OF NUCLEAR FUEL PRODUCTS

This is a continuation of application Ser. No. 410,978, filed 24 Aug. 1982, now abandoned.

FIELD OF THE INVENTION

This invention relates generally to the ceramic art and the formation of sintered bodies from particulate oxide materials. It is particularly concerned with a process for producing consolidated units of particulate ceramic materials including the compressing of such particles into coherent and handleable compacts for subsequent sintering to integrated bodies. The invention is specifically directed to the manufacture of nuclear fuel products from particulate materials containing uranium dioxide.

BACKGROUND OF THE INVENTION

Fissionable nuclear fuel comprises a variety of compositions and forms of fissionable materials, including ceramic compounds of uranium, plutonium and thorium. Fuel compounds for commercial energy generating reactors typically comprise oxides of uranium, plutonium and thorium, and mixtures thereof. The generally most suitable and commonly used fuel for such commercial nuclear reactors is uranium dioxide, which can be combined with minor amounts of other fuel materials and include neutron flux controlling additives such as gadolinium.

Commercially produced uranium dioxide is a fine, fairly porous powder, a form which is not suitable as such for use as fuel in commercial reactors. A number of means have been developed and used to convert powdered uranium dioxide into a form suitable for use as a fuel in power generating nuclear reactors. One commonly used technique has been to sinter appropriately sized bodies of the powdered uranium dioxide material at high temperatures to develop strong diffusion bonds between the individual powder particles.

However, the sintering technique requires a preliminary compressing of the loose powder into a shaped, and self-retaining compacted body of particles of sufficient strength and integrity to survive handling and the sintering procedure. The operation of compressing fine particles into a body or coherent compact with acceptable low reject levels, and with the strength and uniformity for enduring subsequent handling and firing has been a subject of considerable concern and investigation in the nuclear fuel industry.

Conventional organic or plastic binders commonly used in powder fabrication have been considered to be unsuitable in nuclear fuel processing operations. Entrainment of any binder residues such as carbon within the sintered nuclear fuel product is unacceptable in reactor service. Moreover, the presence of any organic binder among the particles inhibits the formation during sintering of strong diffusion bonds between the particles, and adversely affects the density of the sintered product. The complete removal of binders, or their decomposition products, prior to sintering is especially difficult, and usually requires a costly additional operation in the fuel manufacture.

Accordingly, a common method has been to die press uranium dioxide powder into appropriately sized "green" (unfired) compacts without the assistance of any binder. This approach however has resulted in very costly high rates of rejects and scrap material recycling because of the weakness of such green, binder-free compacts of powder.

U.S. Pat. No. 4,061,700, issued Dec. 6, 1977, to Gallivan, and assigned to the same assignee as this application, discloses a distinctive group of fugitive binders that improved the production of sintered pellets of particulate nuclear fuel materials for nuclear reactors. The fugitive binders of this patent function without contaminating the resulting fuel product, and they permit the formation of effective bonds between sintered particles during firing without deleteriously affecting the desired porosity of the fused pellet.

The disclosure of the said U.S. Pat. No. 4,061,700, and of U.S. Pat. Nos. 3,803,273; 3,923,933; and 3,927,154, assigned to the same assignee as the instant application, and relating to significant aspects in the subject field of producing nuclear fuel pellets from particulate fissionable ceramic material for reactor service, are all incorporated herein by reference.

The prior art techniques or means such as disclosed in U.S. Pat. No. 4,061,700, have been found wanting in some conditions and circumstances. For instance it has been observed that the fugitive binders of the aforesaid patent do not provide consistent results as to pellet strength and integrity irrespective of the blending conditions and particle characteristics of the uranium dioxide powder. Specifically the severity of agitation in blending, relative humidity and temperature, and duration of storage, as well as the uranium oxide powder properties such as size, surface area and moisture content are all factors that apparently can detract from the uniformity of the physical attributes provided by such fugitive binders.

This invention deals with the typical brittle nature of ceramic materials and problems imposed thereby when compression molding such materials comprising uranium dioxide powder and also occurring in the resulting molded compact. As is well known, ceramic materials are generally of a relatively brittle consistency as opposed to a plastic or conformable consistency. Thus, rather than gradually deforming over a period of progressively increasing applied compressive stress approaching the breaking point as is the case with a plastic material, ceramics tend to rigidly resist substantially all deformation until the breaking point is reached whereupon they abruptly fracture with the resulting fissure or fissures instantly progressing through the mass fragmenting it. An apt illustration of this brittle and unyielding property and the fracture characteristics of a ceramic is the crushing of a glass marble. On the other hand, a plastic material will gradually yield and deform with progressively increasing compressive stress until reaching its breaking point and rupturing, and commonly the propagation of the resulting fracture is of a slower rate and does not continue to the extent of fragmenting the mass. Thus a plastic type of material is more amenable to compression molding than the brittle type of materials.

This inherent brittle characteristic in uranium dioxide powder, or its lack of plasticity, constitutes a significant shortcoming when subjected to compression molding operations and in the properties of the molded products.

SUMMARY OF THE INVENTION

This invention comprises a method of producing coherent compacts from particulate ceramic material wherein the ceramic material is rendered more conformable and cohesive while undergoing compression molding. The invention includes the use of a unique fugitive binder for particulate ceramic material comprising a combination of acrylic:acid polymers of relatively high molecular weight and ammonium bicarbonate.

OBJECTS OF THE INVENTION

It is a primary object of this invention to provide an improved method for compression molding particulate ceramic materials.

It is another object of this invention to provide means for overcoming the brittle nature of ceramic particles and to impart lubricity to such a material whereby it can be compression molded under essentially all compacting conditions and at high rates with a lower level of surface imperfections and cracks.

A further object of this invention is to provide a new and improved fugitive binder for improving the compression molding of particulate ceramic materials comprising uranium dioxide into coherent compacts, and increasing the resistance of such compacts of ceramic materials to fracture and end flaking during compression molding and thereafter, including the sintered products of the molded material.

A still further object of this invention is to provide a novel fugitive binder for producing nuclear fuel pellets comprising uranium dioxide from particulate ceramic material wherein the particulate ceramic is compression molded to a coherent compact at fast rates with minimal rejects due to punch sticking or fractures in the coherent compact.

DETAILED DESCRIPTION OF THE INVENTION

This invention comprises a method for producing a fissionable nuclear fuel product in pellet-like form from particulate ceramic material utilizing a fugitive binder which is subsequently removed during the sintering operation. The invention includes a new fugitive binder for compression molding of particulate ceramic material comprising uranium dioxide powder to form coherent compacts of apt dimensions, and thereafter sintering the compacts to produce integrated bodies of fissionable nuclear fuel suitable for use in nuclear reactors.

The particulate fissionable nuclear fuel materials for use in this invention comprise ceramic compounds consisting of oxides of uranium used as nuclear fuel for nuclear reactors.

The particulate nuclear fuel material in the practice of the invention can also include various additives such as neutron absorbing materials comprising gadolinium to moderate neutron flux densities.

Fugitive binders suitable for use in the practice of this invention comprise a combination of acrylic acid polymer or polymers and ammonium bicarbonate. The polymers of acrylic acid for use in this invention are of relatively high molecular weights, namely above about 400,000, and preferably of a range of about 400,000 up to about 4,000,000 molecular weight. They include such relatively high molecular weight acrylic acid polymers containing carboxyl groups having the structure

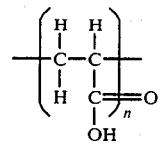

One commercial source of suitable acrylic acid polymeric material for use in this invention comprises B. F. Goodrich's "CARBOPOL" resins.

The ratio of the said acrylic acid polymer to ammonium bicarbonate in the combination fugitive binder of this invention is of the approximate proportions of about 1 part by weight of acrylic acid polymer to about 4 to about 8 parts by weight of ammonium bicarbonate. A preferred embodiment of the invention comprises a ratio of about 1 part by weight of the acrylic acid polymer to about 6 parts by weight of ammonium bicarbonate.

The combination binder is preferable employed in amounts of from about 0.5% to about 7% by weight based upon the weight of the nuclear fuel material. Amounts in excesses beyond about 7% do not generally provide a proportionally commensurate benefit in bonding capacity, and may introduce unwanted effects which compromise any advantages or the costs of including greater amounts of the bonding agent.

In accordance with the method of this invention, the fugitive binder combination is added without water to the particulate ceramic fuel consisting of uranium oxide and the binder blended substantially uniformly through the particulate material. Thereafter, the blend of particulate ceramic material and added combination binder is compressed into a coherent compact of suitable dimensions in accordance with procedures and means of the art. The method of this invention enables the effective use of such blends in high speed, continuous production rotary press devices and operation.

The "green" (unfired) coherent compacts thus formed are then sintered in accordance with the practices and procedures of the art to expel binder material and integrate the ceramic particles into a uniform and continuous body. The sintered product, typically in the form of a pellet, is thereafter ground to specified dimensions for its designated service.

Blending of the added binder can be effected with any appropriate "dry" mixing apparatus including low shear blenders such as fluidized bed, slab and ribbon blenders, and high shear or intensive blenders such as vibratory mills, ball mills and centrifugal mills.

One such blending apparatus comprises vibratory mills of the type described in pages 8-29 to 8-30 to Perry and Chilton's 5th edition of *Chemical Engineering Handbook,* McGraw-Hill Book Co.

The blending of the particulate material with the binder without the addition of water, should include a dwell time of at least about 5 minutes and preferably at least about 10 minutes. This dwell period provides for the combination binder to produce an effective bonding mechanism and also the lubrication of the brittle mixture of ceramic particles to render them more plastic and resistant to sticking to confining walls in compression molding.

Upon attaining a substantially uniform blend of the added combination binder with the ceramic material, the blend thereof can be compression molded into coherent compacts by substantially any effective means or device in accordance with the technology of this field such as is described in the prior art, including the above cited patents and pending applications. The coherent compacts are then sintered to expel binder material therefrom and integrate the ceramic particles into an essentially continuous body of substantially uniform consistency, and relatively high strength and good resistance to fracture.

An example of a preferred procedure for the practice of the method of this invention is as follows.

A charge of enriched uranium dioxide powder, granulated to a substantially uniform particle size, is deposited in a vibratory mill (Sweco Inc. Vibro-Energy mill) for blending with a fugitive binder. A dry mixture of acrylic acid polymer (B. F. Goodrich's CARBOPOL resin, Type 907, approx. mol. wt. 450,000) and ammonium bicarbonate in a ratio of about 1 to about 6 parts by weight is added to the charge of uranium dioxide powder in such a quantity to provide about 1.9% by weight of said combination binder based upon the weight of the powder.

The uranium dioxide powder and added binder is blended for a period of about 10 minutes to achieve good uniformity, and aged about 3 days. The blended and aged mixture of binder and powder is then compressed molded. to a coherent compact at a pressure of about 25,000 pounds per square inch. The coherent compacts thus produced can then be sintered in a conventional manner.

We claim:

1. A method of producing fissionable nuclear fuel pellets containing uranium dioxide, consisting essentially of the steps of:
   (a) admixing particulate uranium dioxide nuclear fuel with a fugitive binder comprising a combination of about 1 part by weight of high molecular weight acrylic acid polymer having an average molecular weight of at least about 400,000 and about 4 to about 8 parts by weight of ammonium bicarbonate;
   (b) forming the resultant admixture by pressing into a coherent compact; and
   (c) sintering the resultant admixture of said particulate uranium dioxide with acrylic acid polymer and ammonium bicarbonate fugitive binder formed into a compact to expel binder material and integrate the particulate uranium dioxide nuclear fuel into a uniform body.

2. The method of claim 1, wherein the fugitive binder is admixed with particulate uranium dioxide nuclear fuel in amount of about 0.5% to about 7% by weight of said binder based upon the weight of the uranium dioxide fuel.

3. The method of claim 1, wherein the acrylic acid polymer and ammonium bicarbonate are in the approximate proportions of about 1 part by weight of said polymer to about 6 parts by weight of the ammonium bicarbonate.

4. The method of claim 1, wheren the acrylic acid polymer comprises polymers having molecular weight within the approximate range of from about 400,000 up to about 4,000,000.

5. The method of claim 1, wherein the acrylic acid polymer contains carboxyl groups having the structure

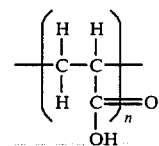

6. A method for producing fissionable nuclear fuel pellets containing uranium dioxide, consisting essentially of the steps of:
   (a) admixing particulate uranium dioxide nuclear fuel with a fugitive binder comprising a combination of about 1 part by weight of high molecular weight acrylic acid polymer having an average molecular weight of at least about 400,000 and about 6 to about 8 parts by weight of ammonium bicarbonate, said fugitive binder being admixed with the uranium dioxide nuclear fuel in amount of about 0.5% to about 7% by weight of said binder based upon the weight of the uranium dioxide fuel;
   (b) forming the resultant admixture of uranium dioxide fuel and binder by pressing into a coherent compact; and
   (c) sintering the compact of the admixture of said particulate uranium dioxide with acrylic acid polymer and ammonium bicarbonate fugitive binder to expel binder material and integrate the particulate uranium dioxide nuclear fuel into a uniform body.

7. The method of claim 6, wherein the acrylic acid polymer comprises polymers having molecular weights within the approximate range of at least about 400,000 up to about 4,000,000.

8. The method of claim 6, wherein the acrylic acid polymer contains carboxyl groups having the structure

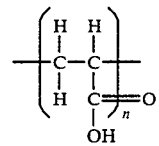

* * * * *